(12) United States Patent
Golowka et al.

(10) Patent No.: US 6,496,324 B1
(45) Date of Patent: *Dec. 17, 2002

(54) DISK DRIVE EMPLOYING METHOD OF UNLATCHING ACTUATOR ARM USING VCM VOLTAGE LIMITING CIRCUIT TO LIMIT ACTUATOR ARM VELOCITY

(75) Inventors: Daniel M. Golowka, Rochester, MN (US); David M. Suckling, Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/342,795

(22) Filed: Jun. 29, 1999

(51) Int. Cl.[7] ................................. G11B 5/596
(52) U.S. Cl. ........................ 360/78.12; 360/75
(58) Field of Search ................. 360/75, 78.12

(56) References Cited

U.S. PATENT DOCUMENTS 5,303,101 A * 4/1994 Hatch et al. ............... 360/258
5,877,914 A * 3/1999 Gontowski, Jr. ........ 360/78.12
6,396,652 B1 * 5/2002 Kawachi et al. ............ 360/75

* cited by examiner

Primary Examiner—David Hudspeth
Assistant Examiner—Mitchell Slavitt
(74) Attorney, Agent, or Firm—Milad G. Shara, Esq.; Howard H. Sheerin, Esq.

(57) ABSTRACT

A disk drive employs a method of unlatching an actuator arm from a latch restraining the actuator arm in a disk drive. The disk drive includes a first node, a second node, and a voice coil motor (VCM) coupled to the actuator arm. The VCM includes a coil connected between the first node and the second node. The method includes applying a voltage between the first node and the second node to cause current to flow through the coil in order to move the actuator arm away from the latch at a variable actuator arm velocity. The method includes temporarily activating a VCM velocity control signal to enable a VCM voltage limiting circuit connected in parallel with the coil between the first node and the second node. The method further includes limiting the voltage applied across the coil to a predetermined VCM voltage level with the enabled VCM voltage limiting circuit in order to limit the actuator arm velocity.

7 Claims, 5 Drawing Sheets

DISK DRIVE EMPLOYING METHOD OF UNLATCHING ACTUATOR ARM USING VCM VOLTAGE LIMITING CIRCUIT TO LIMIT ACTUATOR ARM VELOCITY

BACKGROUND OF THE INVENTION

1. Field of the Invention

The present invention relates to disk drives. More particularly, the present invention relates to a disk drive employing a method of unlatching an actuator arm using a voice coil motor (VCM) voltage limiting circuit to limit actuator arm velocity.

2. Description of the Prior Art

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

In hard disk drives, data is stored on magnetic media disks in concentric data tracks, which are divided into groups of data sectors. Servo information is recorded in radially continuous narrow wedges between the groups of data sectors. A head disk assembly of a disk drive includes an actuator assembly having a voice coil motor (VCM), an actuator arm extending from the VCM, and a transducer head disposed at the end of the actuator arm. The VCM includes a coil moving in proximity to a permanent magnet. The VCM swings the actuator arm and the transducer heads back and forth over the disk to access target data tracks on the disk surface.

During a latch mode, the transducer head is parked away from the data tracks to protect the transducer head and the disk surface, and a latch, such as a magnetic latch, typically restrains the actuator arm in place in the head disk assembly. During an unlatch mode, the VCM is controlled to overcome the force of the magnetic latch to move the actuator arm away from the latch, in what is referred to as unlatching the actuator arm, to position the transducer head over the data area of the disk surface. The actuator arm must be unlatched so that the transducer head can move radially across the disk surface while the head disk assembly is connected in either the disk drive or a servowriter. A problem exits because the amount of current supplied to the VCM to break free of the magnetic latch causes the actuator arm to move away from the latch at a variable actuator arm velocity toward an outer diameter crash stop in the head disk assembly or a push pin in the servo writer. The actuator arm must be slowed to an actuator arm velocity which will not cause damage to the transducer head or disk surface during impact of the actuator arm against the outer diameter crash stop or the push pin.

There exits substantial competitive pressure to develop mass-market hard disk drives with more robust designs that are less sensitive to operator handling and external vibrations. In particular, if the actuator arm unlatches from the latch and the transducer head lands into the data area of the disk, the transducer head and/or the disk surface can be severely damaged. It is known to provide stronger latches to resist the actuator arm coming off the latch when the disk drive is in the latch mode, such as during the manufacturing process or user handling of the disk drive. However, the increasing strength of magnetic latches and other latches makes it more difficult to unlatch the actuator arm, and higher unlatching currents need to be applied to the VCM in order to unlatch the actuator arm. The increased unlatching currents result in a larger variability of possible actuator arm velocities after the actuator arm moves away from the latch, which increases the probability of the actuator arm hitting the outer diameter crash stop or push pin at too fast of an actuator arm velocity.

When the head disk assembly is placed in the servowriter for writing servo information on the disks during the manufacturing process, a first series of current pulses are applied to the VCM in order to move the actuator arm away from the magnetic latch. A second series of current pulses are then applied in the reverse direction to reduce the actuator arm velocity. The amplitude and widths of the second series of current pulses can be ascertained by empirical analysis on a disk drive product. An example current pulse sequence comprises an unlatch pulse period, a coast period, and a brake pulse period. The unlatch pulse period typically applies positive current to the VCM for a predetermined period of time. The coast period is a predetermined period of time where zero current is applied to the VCM. The brake pulse period typically applies negative current to the VCM for a predetermined period of time. For such a current pulse sequence, the predetermined time periods and the amount of current applied to the VCM during the unlatch pulse period and during the brake pulse period must have sufficient margins to allow for variations in the VCM and latch assembly of the particular disk drive. Moreover, if the negative current applied to the VCM to slow the actuator arm during the brake pulse period is too high or if the negative current is applied for too long of time period, the actuator arm may return to an inner diameter crash stop and become re-latched in the latch. When the head disk assembly is connected in the disk drive, a similar current pulse sequence is used to unlatch the actuator arm from the magnetic latch. However, the brake pulse period is typically employed to slow down the actuator arm velocity to a sufficiently slow velocity to permit a servo system in the disk drive to detect the servo information on the disk surface. Once the servo system of the disk drive is able to detect the servo information, the servo system employs conventional closed loop servo control to control the actuator arm velocity and the position of the actuator arm over the disk. If the servo system, however, does not detect the servo information, the actuator arm velocity can not be controlled by the closed loop servo system. If the actuator arm velocity is not controlled by the closed loop servo system, the actuator arm velocity when the actuator arm hits the outer diameter crash stop can be at a level which causes damage to the transducer head and/or the disk.

A disk drive that employs a ramp load design may include a velocity feedback circuit to control the actuator arm velocity. The velocity feedback circuit employs the back electromotive force (BEMF) of the VCM to monitor and control the actuator arm velocity to thereby control the speed at which the transducer head moves away from the ramp and over the disk surface. The velocity feedback circuit includes complex closed loop circuitry to measure the BEMF and compute actuator arm velocity that is used for controlling the amount of current applied to the VCM.

For reasons stated above, there is a need for a circuit or method to control the actuator arm velocity in a cost effective manner in a head disk assembly of a hard disk drive after the actuator arm is released and moves away from the latch.

SUMMARY OF THE INVENTION

The invention can be regarded as a method of unlatching an actuator arm from a latch restraining the actuator arm in a disk drive. The disk drive includes a first node, a second node, and a voice coil motor (VCM) coupled to the actuator arm, the VCM including a coil connected between the first node and the second node. The method includes the step of applying a voltage between the first node and the second node to cause current to flow through the coil in order to move the actuator arm away from the latch at a variable actuator arm velocity. The method also includes the step of temporarily activating a VCM velocity control signal to enable a VCM voltage limiting circuit connected in parallel with the coil between the first node and the second node. The method also includes the step of limiting the voltage applied across the coil to a predetermined VCM voltage level with the enabled VCM voltage limiting circuit in order to limit the actuator arm velocity.

The invention can also be regarded as a disk drive connectable to a power supply. The disk drive includes an actuator arm, a latch for restraining the actuator arm, a first node, a second node, and a voice coil motor (VCM) coupled to the actuator arm. The VCM has a coil connected between the first node and the second node. The disk drive further includes a VCM driver coupled to the power supply for applying a voltage between the first node and the second node to cause current to flow through the coil in order to move the actuator arm away from the latch at a variable actuator arm velocity. The disk drive further includes control means for temporarily activating a VCM velocity control signal. The disk drive further includes a VCM voltage limiting circuit connected in parallel with the coil between the first node and the second node. The VCM voltage limiting circuit is responsive to the VCM velocity control signal being temporarily activated for limiting the voltage applied across the coil to a predetermined VCM voltage level in order to limit the actuator arm velocity.

DESCRIPTION OF THE PREFERRED EMBODIMENTS Disk Drive

Figure 1:
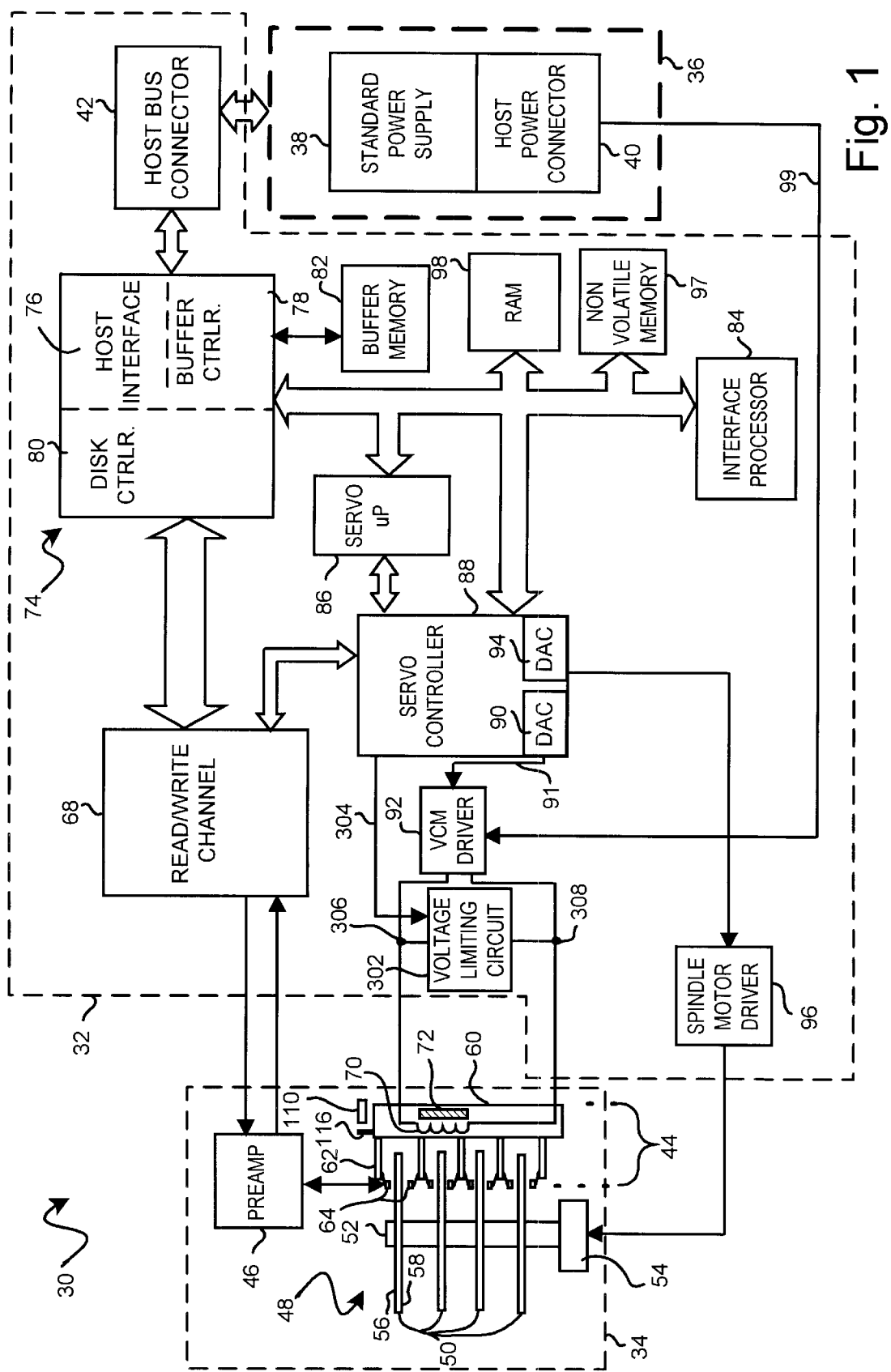
FIG. 1 is a block diagram of a hard disk drive employing a method of unlatching an actuator arm using a VCM voltage limiting circuit to limit the actuator arm velocity.

Referring to FIG. 1, a hard disk drive 30 employs a method of unlatching an actuator arm, such as an actuator arm 62, using a VCM voltage limiting circuit, such as VCM voltage limiting circuit 302, to limit velocity of the actuator arm.

Disk drive 30 includes a disk controller circuit board 32 and a head disk assembly (HDA) 34. Disk controller circuit board 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Host system 36 includes a standard power supply 38 which supplies power to disk controller circuit board 32 via a power supply connector 40. Data is transmitted between host system 36 and disk controller circuit board 32 via a host bus connector 42.

HDA 34 includes an actuator assembly 44, a preamplifier 46, and a disk assembly 48. Disk assembly 48 includes a plurality of magnetic media disks, such as indicated at 50. Disks 50 are stacked on a spindle assembly 52. Spindle assembly 52 is mechanically coupled to a spindle motor 54 for rotating disks 50 at a high rate of speed. Each disk 50 includes two disk surfaces capable of storing data thereon, such as indicated at 56 and 58. Actuator assembly 44 includes a voice coil motor (VCM) 60 and actuator arms 62 extending from VCM 60. Each actuator arm 62 corresponds to a respective disk surface such as 56 or 58. A transducer head 64 is disposed at the end of each actuator arm 62, and each transducer head 64 is associated with a disk surface 56 or 58. Transducer heads 64 communicate with disk controller circuit board 32 via preamplifier 46 for reading and writing data to the transducer head's associated disk surface. Preamplifier 46 is electrically coupled to transducer head 64 for receipt and amplification of position signals representative of the position of transducer head 64. Preamplifier 46 provides an amplified signal to a read/write channel 68 of disk controller circuit board 32. Read/write channel 68 performs encoding and decoding of data written to and read from disks 50.

VCM 60 includes a coil 70 moving in proximity to a permanent magnet 72. Actuator arms 62 are coupled to VCM 60. VCM 60 swings actuator arms 62 and their corresponding transducer heads 64 over their associated disk surfaces 56 or 58 to access target data tracks formed on the associated disk surface.

Disk control circuit board 32 includes a host interface and disk controller (HIDC) integrated circuit 74. HIDC 74 includes a host interface 76, a buffer controller 78, and a disk controller 80. Host interface 76 communicates with host system 36 via host bus connector 42 by receiving commands and data from and transmitting status and data back to host system 36. Buffer controller 78 controls a buffer memory 82 employed for storing data from host system 36 which is to be written to disks 50. In addition, buffer controller 78 controls buffer memory 82 for storing read data from disks 50 to be transmitted to host system 36 via host interface 76. Buffer memory 82 typically comprises random access memory (RAM), such as dynamic random access memory (DRAM).

Disk controller 80 sends data to and receives data from read/write channel 68. Disk controller 80 also provides for error correction and error detection on data transmitted to or read from disk 50.

An interface processor 84 handles the flow of data and commands received by host interface 76 by sending commands to and reading status from disk controller 80. Interface processor 84 ascertains which commands to process from host system 36 and when to process these commands, and directs other tasks performed by disk controller 80.

A servo processor 86 commands a servo controller 88 to control the position of transducer head 64 over disk 50 at a target data track for subsequent execution of read or write commands. Servo processor 86 receives a representative form of the position signals sensed by transducer head 64 and amplified by preamplifier 46 via read/write channel 68 and servo controller 88 and performs calculations to position transducer head 64 relative to its associated disk surface. Servo processor 86 commands a digital-to-analog converter (DAC) 90 in servo controller 88 to provide a corresponding analog signal representing desired VCM coil current on a line 91 to a VCM driver 92. VCM driver 92 responds to the analog signal on line 91 to provide a current to VCM 60. Power is supplied from standard power supply 38 through power supply connector 40 to VCM driver 92 via a power line 99. More specifically, the current from VCM driver 92 is provided to coil 70 of VCM 60 and causes actuator arm 62 to swing and thereby move transducer head 64 over an associated disk surface 56 or 58 to access target data tracks.

Servo processor 86 also provides commands servo controller 88 to control the rotational velocity of spindle motor 54. A DAC 94 in servo controller 88 provides an analog signal to a spindle motor driver 96. Spindle motor driver 96 responds to the analog signal from DAC 94 to drive and thereby control the speed of spindle motor 54. Spindle motor driver 96 also detects a back electromotive force (BEMF) of spindle motor 54 and provides a signal representative of the spin-rate of spindle motor 54 to servo controller 88 which converts the signal into a monitored velocity signal which can be read by servo processor 86. In this way, servo processor 86 can control the spin-rate of spindle motor 54 via servo controller 88 to maintain a substantially constant spin-rate of rotating disks 50.

Disk system operational programs are stored in non-volatile memory 97, such as read-only memory (ROM) or flash memory, and can be all or partially loaded into RAM 98 for execution from RAM 98 or both RAM 98 and non-volatile memory 97. Alternatively, portions of disk system operational programs are stored on reserve cylinders on disk 50. Suitably, servo processor 86 may have integrated or separate memory (not shown) for storage of servo programs.

The current track position of transducer head 64 is stored by servo processor 86 to determine a required seek distance between the current data track and a target data track. Based on the required seek distance, servo processor 86 retrieves a corresponding read or write seek profile and provides a digital signal command to DAC 90 corresponding to the seek profile. DAC 90 provides a corresponding analog signal to VCM driver 92 representative of the seek profiles. VCM driver 92 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of servo wedges disposed on disk surface 56 or 58. Based on this position information, a position error signal is provided via preamplifier 46, read/write channel 68, and servo controller 88 to servo processor 86 to provide a representative position of transducer head 64 relative to its associated disk surface 56 or 58. Upon completion of a seek operation and the corresponding alignment of transducer head 64 over the target data track, a read or write command is executed to read data from or write data to the target data track.

Servowriter

Figure 2:
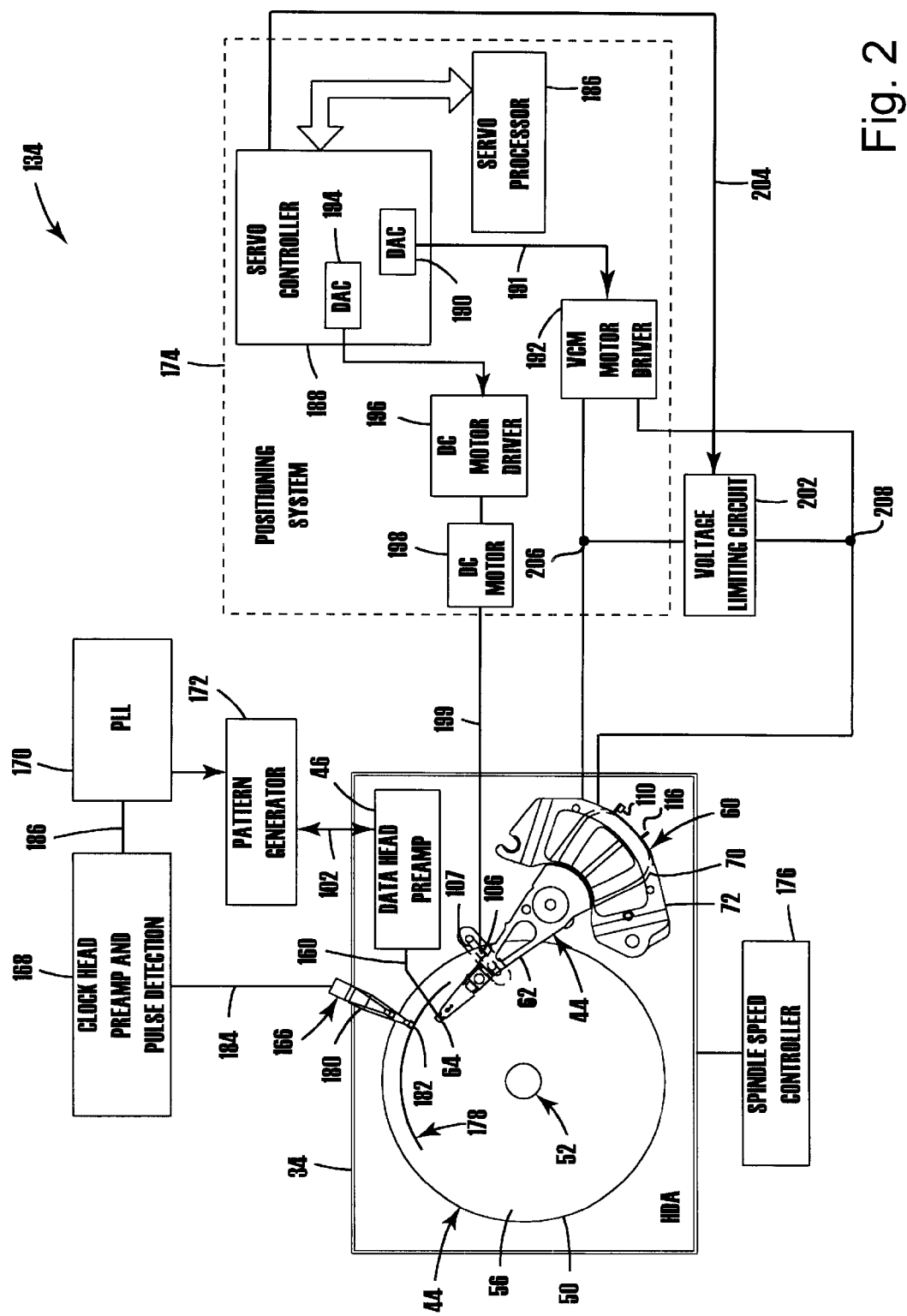
FIG. 2 is a block diagram of a head disk assembly (HDA) placed in a servowriter employing a method of unlatching an actuator arm using a VCM voltage limiting circuit to limit the actuator arm velocity.

Referring to FIG. 2, HDA 34 is placed in a servowriter (servo track writer) 134 employing a method of unlatching an actuator arm, such as an actuator arm 62, using a VCM voltage limiting circuit, such as VCM voltage limiting circuit 202, to limit velocity of the actuator arm. Servowriter 134 is employed for precisely writing servo tracks (i.e., servo sectors) on disk surfaces 56/58 in HDA 34. Servowriter 134 writes a clock track 178 on disk surface 56, wherein the clock track provides a continuous stream of reference timing information to servowriter 134 during the servo writing process.

While positioned within servowriter 134 during the manufacturing process, transducer head 64 communicates with servowriter 134 via preamplifier 46 and a line 160 for writing servo sectors on the associated disk surface 56 . Preamplifier 46 receives and transmits signals to and from a servowriter pattern generator 172 via a line 102.

Servowriter 134 includes clock head assembly 166, clock head preamplifier and pulse detector (pulse detector) 168, phase locked-loop (PLL) 170, pattern generator 172, positioning system 174, and spindle speed controller 176. Clock head assembly 166 initially operates to write clock track 178 on disk surface 56. Clock assembly 166 also cooperates with pulse detector 168 and PLL 170 to provide a reference timing clock to pattern generator 172 by reading the clock track 178. Pattern generator 172 operates to provide servo information, for writing servo tracks, synchronized to the reference timing clock during rotation of disk 50, which is rotatably controlled by spindle speed controller 176. Positioning system 174 operates to incrementally move the transducer head 64 in an arcuate path from an outer diameter to an inner diameter of the disk for writing each servo track.

Clock head assembly 166 includes clock arm 180 which extends over disk surface 56. A clock head 182 is disposed at the end of clock arm 180. Clock head 182 is electrically coupled to pulse detector 168 via connecting means 184. Clock head 182 communicates with pattern generator 172 via pulse detector 168 and PLL 170 for writing clock track 178 on disk surface 56 and subsequently reading the clock track 178 for providing the reference timing clock to pattern generator 172. Clock head preamplifier and pulse detector 168 receives signals from clock head 182 representative of magnetic transitions which form the clock track 178 on disk surface 56. Pulse detector 168 is electrically coupled to PLL 170 via connecting means 186 and provides an amplified signal to PLL 170.

PLL 170 operates to lock onto the reference timing clock provided by the clock track 178, and provides a reference timing clock to pattern generator 172 which has been adjusted to compensate for any speed variations in the rotation of disk 50.

Positioning system 174 provides for radial positioning of the transducer head 64 during the servo writing process. In one exemplary embodiment, positioning system 174 utilizes a laser interferometer positioning system for precisely and incrementally moving the transducer head 64 in an arcuate path from track to track during the servo writing process.

Positioning system 174 includes a servo processor 186, a server controller 188, a VCM driver 192, a motor driver 196, and a DC motor 198. Servo processor 186 commands servo controller 188 to control the position of the transducer head 64 over disk 50 during the servo writing process. Servo processor 186 commands a DAC 190 in servo controller 188 to provide a corresponding analog signal representing desired VCM coil current on a line 191 to VCM driver 192. VCM driver 192 responds to the analog signal representing desired VCM coil current on line 191 to provide a corresponding DC current to VCM 60. More specifically, the DC current from VCM drive 192 is provided to coil 70 of VCM 60 and causes actuator arm 62 to swing and thereby bias actuator assembly 44 against a push-pin 106 of servowriter 134. Push-pin 106 is slideably mounted in a slot 107 during the servo writing process and is moved incrementally via positioning system 174. Because actuator assembly 44 is biased against push-pin 106, actuator arm 62 follows push-pin 106 and incrementally moves from track to track.

Servo processor 186 also commands a DAC 194 in servo controller 188 to provide a corresponding analog signal to motor driver 196. Motor driver 196 responds to the analog signal from DAC 194 to provide a corresponding DC current to DC motor 198 which is mechanically coupled to push-pin 106 via coupling means 199. In this way, DC motor 198 is controlled by servo controller 188 to incrementally move push-pin 106 to cause actuator assembly 44, which is biased against push-pin 106, to incrementally move from track to track.

Magnetic Latch and Crash Stops of HDA

Figure 3:
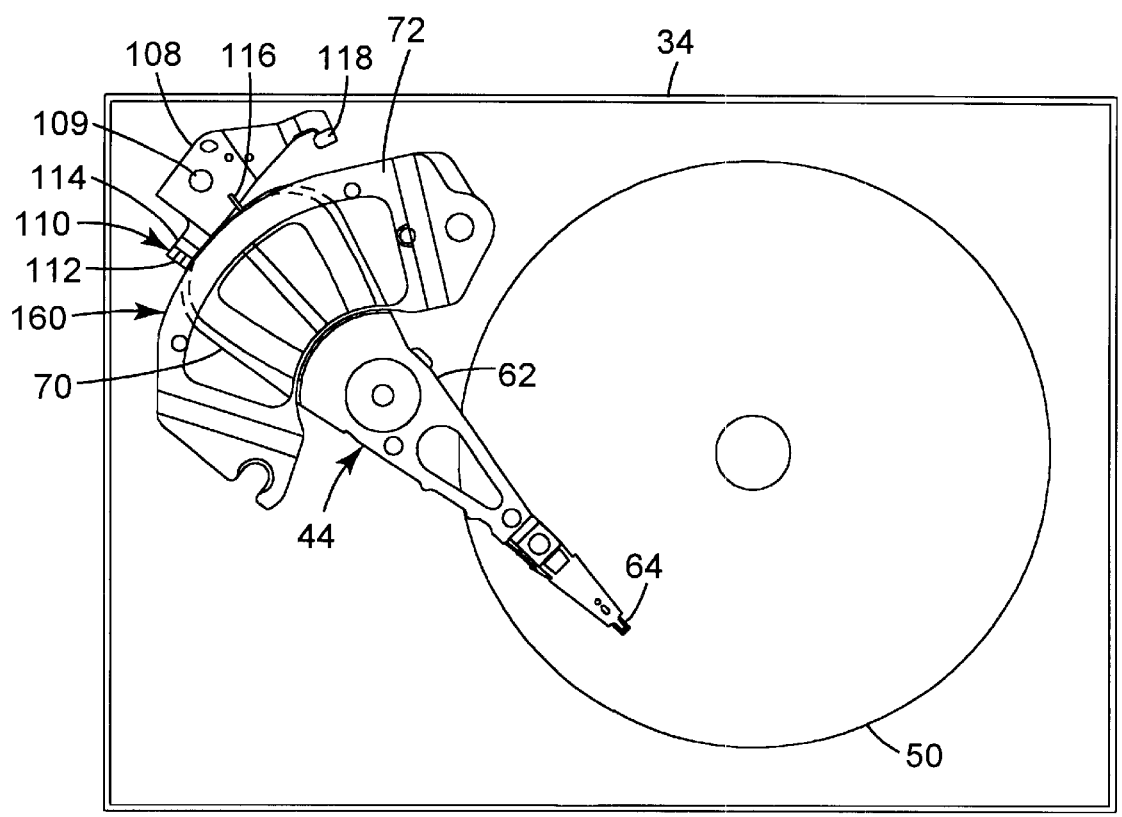
FIG. 3 is a more detailed diagram of an HDA that is connectable in the disk drive of FIG. 1 or in the servowriter of FIG. 2.

Referring to FIG. 3, HDA 34 includes a crash stop plate 108 which is fixedly fastened to HDA 34 with a screw 109. A magnetic latch 110 is attached to crash stop plate 108. Magnetic latch 110 includes an inner diameter crash stop 112 attached to crash stop plate 108 and a permanent magnet 114 attached to inner diameter crash stop 112. In one embodiment, inner diameter crash stop 112 is integral to crash stop plate 108. A metal tab 116 is attached to VCM 60. During a latch mode, magnetic latch 110 holds metal tab 116 with magnetic force to thereby restrain and hold actuator arms 62 at the inner diameter crash stop 112. During an unlatch mode, current is provided to VCM 60 to release metal tab 116 from magnetic latch 110 and move actuator arm 62 away from magnetic latch 110 to thereby move transducer head 64 towards the outer diameter of disk 50 at a variable actuator arm velocity.

When HDA 34 is connected to disk controller circuit board 32 in disk drive 30, actuator arm 62 is stopped from moving past the outer diameter of disk 50 by an outer diameter crash stop 118 attached to crash stop plate 108. In one embodiment, outer diameter crash stop 118 is integral to crash stop plate 108.

When HDA 34 is placed in servowriter 134 during servo track writing of disk 50, actuator arm 62 is stopped from moving past the outer diameter of disk 50 by push-pin 106.

The below described embodiments refer to employing a VCM voltage limiting circuit to limit actuator arm velocity, such as to a substantially constant and safe actuator arm velocity, after releasing and moving actuator arm 62 away from magnetic latch 110 in head disk assembly 34. However, the below described VCM voltage limiting circuits can also be employed to limit the actuator arm velocity after releasing and moving the actuator arm 62 from any type of latch including, but limited to: a solenoid released spring latch; a wind pressure released spring latch; or a ramp load latch. For example, the below described VCM voltage limiting circuits are useful with ramp load latches because as a transducer head flies off the ramp, the actuator arm velocity needs to be controlled so that neither the transducer head nor the disk surface is damaged.

VCM Voltage Limiting Circuit in Disk Drive

Figure 5:
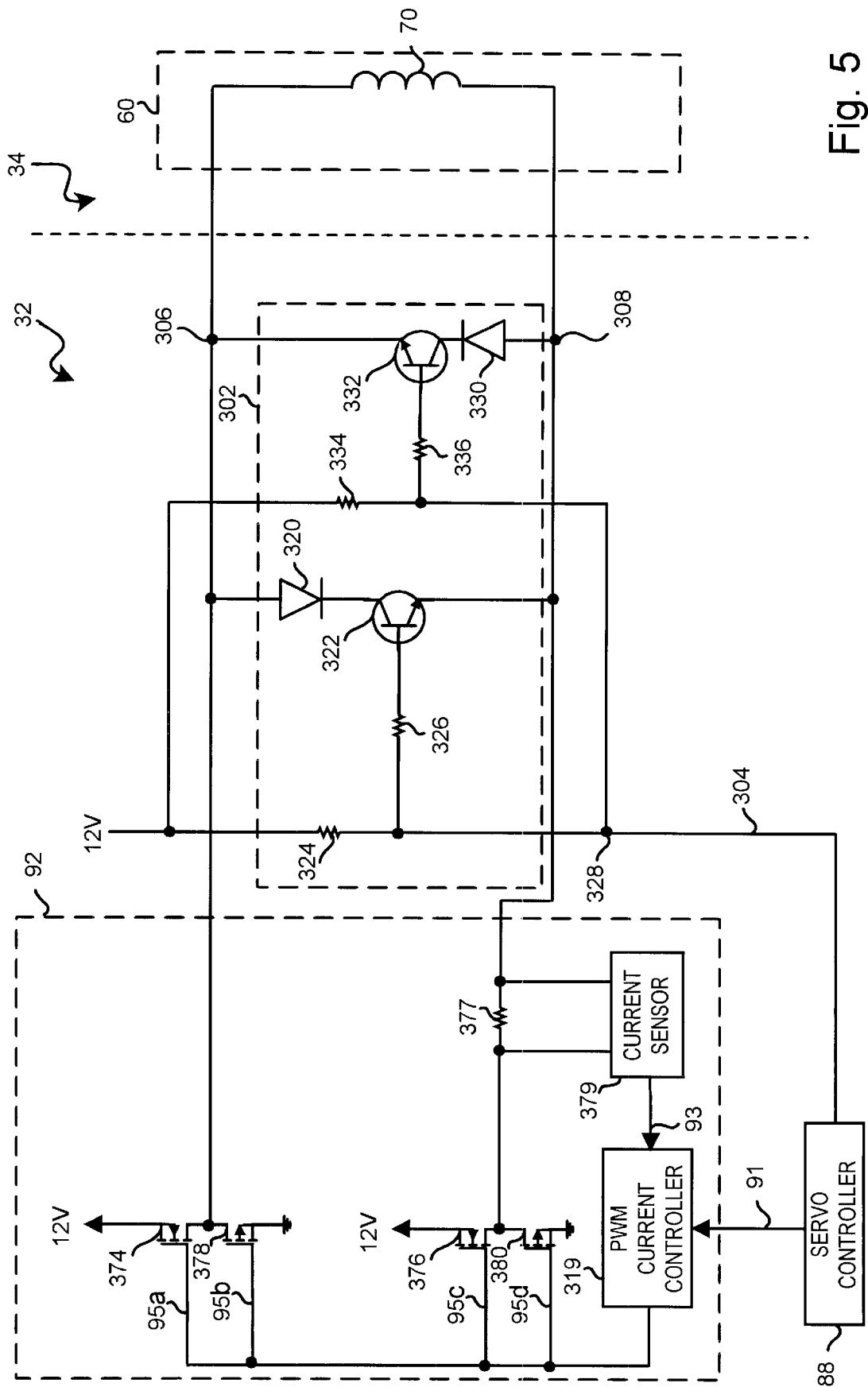
FIG. 5 is a schematic diagram of the VCM voltage limiting circuit employed in the disk drive of FIG. 1.

Referring to FIGS. 1 and 5, disk drive 30 includes VCM voltage limiting circuit 302 connected in parallel with coil 70 between a first node 306 and a second node 308. Servo processor 86 commands DAC 90 in servo controller 88 to provide the corresponding analog signal representing desired VCM coil current on line 91 to VCM driver 92. VCM driver 92 responds to the analog signal on line 91 to provide a corresponding current to VCM 60. More specifically, VCM driver 92 is controlled to apply a voltage V (from power supply 38) between first node 306 and second node 308 to cause current to flow through coil 70 of VCM 60 in order to release and move actuator arm 62 away from magnetic latch 110 at a variable actuator arm velocity, wherein the current has a magnitude that is preferably determined by servo controller 88. In one embodiment, VCM driver 92 is controlled so that current is provided to coil 70 of VCM 60 in the form of unlatch current pulses which typically include forward and backward exciting current pulses to provide a torque for releasing and moving actuator arm 62 away from magnetic latch 110. Servo processor 86 then commands servo controller 88 to temporarily activate a VCM velocity control signal on a line 304 to limit the actuator arm velocity. VCM voltage limiting circuit 302 is responsive to the activation of the VCM velocity control signal on line 304 for limiting the voltage V applied across coil 70 to a predetermined VCM voltage level in order to limit the actuator arm velocity to a substantially constant and safe actuator arm velocity. VCM voltage limiting circuit 302 is preferably an open loop circuit that is temporarily activated by the VCM velocity control signal on line 304 in order to limit the actuator velocity.

The VCM voltage limiting circuit 302 responds to the activation of VCM velocity control signal on line 304 to provide a suitably low resistance path in parallel with coil 70 between first node 306 and second node 308 to limit the actuator arm velocity by limiting the BEMF generated N and applied across coil 70 of VCM 60. The voltage V applied across coil 70 depends on the low 2, resistance path in parallel with coil 70. When VCM velocity control signal on line 304 is activated, the voltage V applied across the low resistance path in parallel with coil 70 defines the predetermined VCM voltage level across coil 70

Thus, activating the VCM velocity control signal on line 304 to provide the low resistance path in parallel with coil 70 of VCM 60 reduces and limits the actuator arm velocity to a substantially constant actuator arm velocity. Actuator arm 62 decelerates until the BEMF of VCM 60 is equivalent to the predetermined VCM voltage level across coil 70 which is defined by the voltage V applied across the low resistance path in parallel with coil 70 between first node 306 and second node 308. At this point, actuator arm 62 is moving at a substantially constant and safe actuator arm velocity toward outer diameter crash stop 118. The safe substantially constant actuator arm velocity corresponds to the predetermined VCM voltage level across coil 70 and can be ascertained by knowing the BEMF factor or voltage constant (Ke) of VCM 60 and the voltage Vcoil across coil 70 as shown by the following Equations I:

$$V_{coil} = V - BEMF = I_{coil} * R_t$$

$$BEMF = Ke * Vel_{actuator\ arm}\ (Vel_{actuator\ arm}\ \text{in rad/sec})$$

$$Vel_{actuator\ arm} = (V - V_{coil})/Ke\ (Ke\ \text{in V/rad/sec})$$

Where:

$V_{coil}$ is the voltage V less the BEMF across coil 70;

V is the voltage applied from power supply 38 via VCM driver 92 between first node 306 and second node 308 which is equal to (1) the voltage applied from power supply 38 when VCM voltage limiting circuit 302 is not enabled, and (2) the predetermined VCM voltage level across coil 70 when VCM voltage limiting circuit 302 is enabled;

BEMF is the back electromotive force of the VCM;

$I_{coil}$ is VCM coil current;

$R_t$ is the total resistance of the VCM coil and the power FETs driving the VCM coil from the VCM power source to ground;

Ke is the Voltage constant of the VCM i.e. the BEMF factor; and $Vel_{actuator\ arm}$ is the velocity of the actuator arm coupled to the VCM.

Because VCM voltage limiting circuit 302 is controlled by control means including servo processor 86 and servo controller 88 via the VCM velocity control signal on line 304, VCM voltage limiting circuit 302 can be temporarily activated at any time during the unlatch mode, and the voltage V applied across coil 70 of VCM 60 can then be held at the predetermined VCM voltage level regardless of the amount of current applied from power supply 38 via VCM driver 92. Suitably, a low level current from power supply 38 is still applied to coil 70 of VCM 60 even after the BEMF of VCM 60 is equivalent to the predetermined VCM voltage level across coil 70, which depends on the voltage V applied across the low resistance path in parallel with coil 70. This low level current compensates for any windage on disk assembly 48 and flex current bias in coil 70. In one embodiment, the substantially constant actuator arm velocity is a sufficiently slow velocity to permit the VCM servo system of disk drive 30 including read/write channel 68, servo processor 86, and servo controller 88 to detect the servo information on disk 50. Once the VCM servo system of disk drive 30 is able to detect the servo information, the VCM servo system employs conventional closed loop servo control to control the actuator arm velocity and the position of actuator arm 62 over disk 50.

Alternatively, the substantially constant actuator arm velocity is a sufficiently slow velocity to permit actuator arm 62 to safely contact outer diameter crash stop 118 without causing damage to transducer head 64 or disk 50.

VCM Voltage Limiting Circuit in Servowriter

Figure 4:
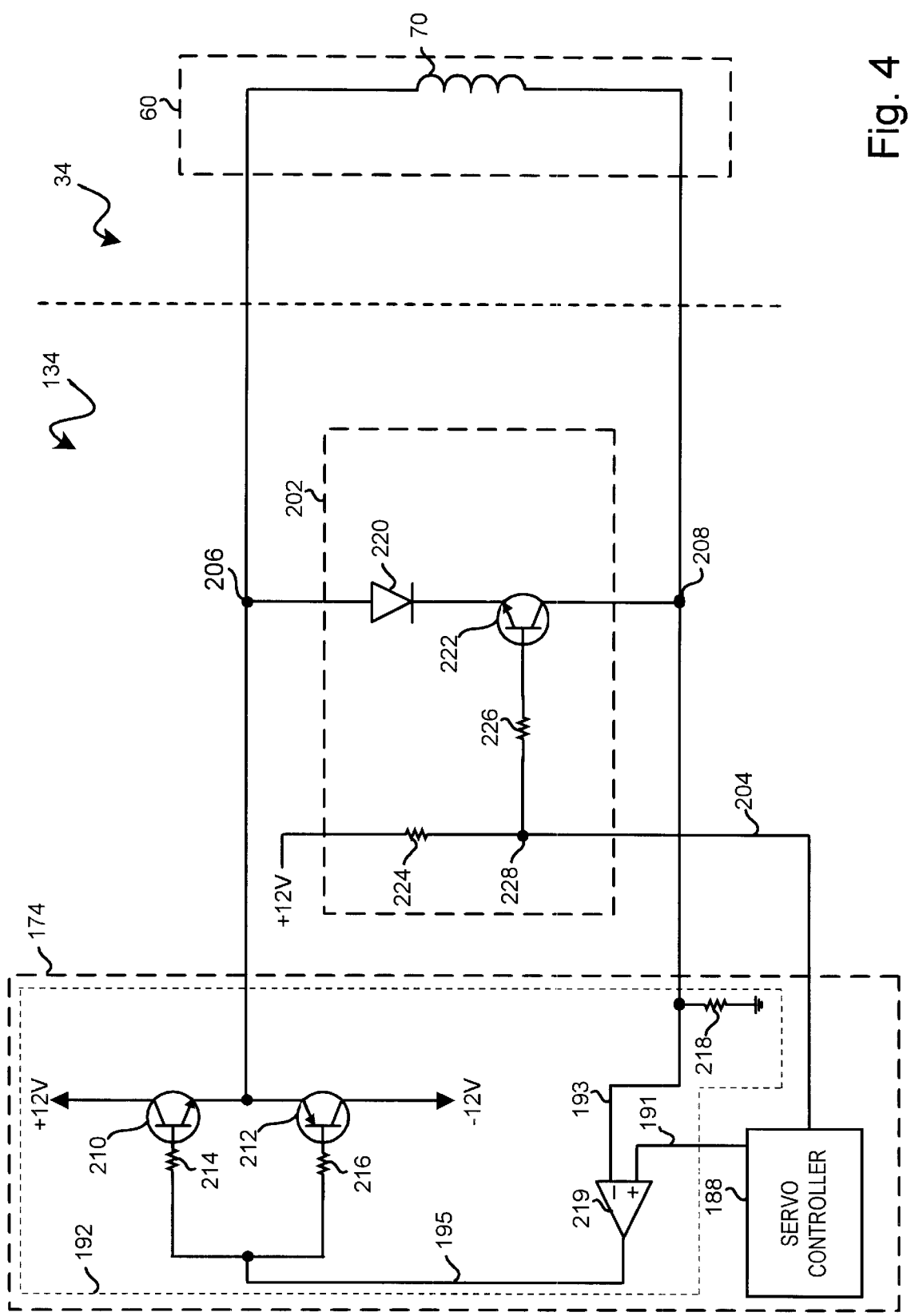
FIG. 4 is a schematic diagram of the VCM voltage limiting circuit employed in the servowriter of FIG. 2.

Referring to FIGS. 2 and 4, servowriter 134 includes a VCM voltage limiting circuit 202 connected in parallel with coil 70 of VCM 60 when HDA 34 is positioned in servowriter 134. VCM voltage limiting circuit 202 is connected between a first node 206 and a second node 208. Servo processor 186 commands DAC 190 in servo controller 188 to provide a corresponding analog signal representing desired VCM coil current on line 191 to VCM driver 192. VCM driver 192 responds to the analog signal on line 191 to provide a corresponding current to VCM 60. More specifically, VCM driver 192 is controlled to apply a voltage V (from an external power supply) between first node 206 and second node 208 to cause current to flow through coil 70 of VCM 60 in order to release and move actuator arm 62 away from magnetic latch 110 at a variable actuator arm velocity, wherein the current has a magnitude that is preferably determined by servo controller 188. In one embodiment, VCM driver 192 is controlled so that current is provided to coil 70 of VCM 60 in the form of unlatch current pulses which typically include forward and backward exciting current pulses to provide a torque for releasing and moving actuator arm 62 away from magnetic latch 110. Servo processor 186 then commands servo controller 188 to temporarily activate a VCM velocity control signal on a line 204 to limit the actuator arm velocity. VCM voltage limiting circuit 202 is responsive to the activation of the VCM velocity control signal on line 204 for limiting the voltage V applied across coil 70 to a predetermined VCM voltage level in order to limit the actuator arm velocity to a substantially constant and safe actuator arm velocity. VCM voltage limiting circuit 202 is preferably an open loop circuit that is temporarily activated by the VCM velocity control signal in order to limit the actuator velocity.

The VCM voltage limiting circuit 202 responds to the activation of VCM velocity control signal on line 204 to provide a suitably low resistance path in parallel with coil 70 of VCM 60 to limit the actuator arm velocity by limiting the BEMF generated across coil 70 of VCM 60. The voltage V applied across coil 70 depends on the low resistance path in parallel with coil 70. When VCM velocity control signal on line 204 is activated, the voltage V applied across the low resistance path in parallel with coil 70 defines the predetermined VCM voltage level across coil 70.

Thus, activating the VCM velocity control signal on line 204 to provide the low resistance path in parallel with coil 70 of VCM 60 reduces and limits the actuator arm velocity to a substantially constant actuator arm velocity. Actuator arm 62 decelerates until the BEMF of VCM 60 is equivalent to the predetermined VCM voltage level across coil 70 which is defined by the voltage V applied across the low resistance path in parallel with coil 70 between first node 206 and second node 208. At this point, actuator arm 62 is moving at a substantially constant and safe actuator arm velocity toward outer diameter crash stop 118 and push pin 106. The safe substantially constant actuator arm velocity corresponds to the predetermined VCM voltage level across coil 70 and can be ascertained by knowing the BEMF factor (Ke) of VCM 60 and the voltage Vcoil across coil 70 as shown by the above Equations I, where V is the voltage applied from an external power supply via VCM driver 192 between first node 206 and second 208 when using VCM voltage limiting circuit 202 in servowriter 134.

Because VCM voltage limiting circuit 202 is controlled by control means including servo processor 186 and servo controller 188 via the VCM velocity control signal on line 204, VCM voltage limiting circuit 202 can be temporarily activated at any time during the unlatch mode, and the voltage V applied across coil 70 of VCM 60 can then be held at the predetermined VCM voltage level regardless of the amount of current applied from the external power supply via VCM driver 192. Suitably, a low level current from the external power supply is still applied to coil 70 of VCM 60 even after the BEMF of VCM 60 is equivalent to the predetermined VCM voltage level across coil 70, which depends on the voltage V applied across the low resistance path in parallel with coil 70. This low level current compensates for any windage on disk assembly 48 and flex current bias in coil 70.

The substantially constant actuator arm velocity is a sufficiently slow velocity to permit the actuator arm 62 to safely contact push pin 106 without causing damage to transducer head 64, disk 50, or push pin 106.

Detailed Operation of VCM Voltage Limiting Circuit in Servowriter

FIG. 4 is a detailed schematic diagram illustrating the operation of VCM voltage limiting circuit 202 in servowriter 134 when HDA 34 is placed in servowriter 134. Servowriter 134 includes first node 206 and second node 208. Coil 70 of VCM 60 is coupled between node 206 and node 208. VCM driver 192 of positioning system 174 includes a NPN bipolar transistor 210 coupled between a +12 volt power rail and node 206 and includes a PNP bipolar transistor 212 coupled between a −12 volt power rail and node 206. VCM driver 192 includes a differential amplifier 219 that generates a control signal 195 in response to (1) the analog signal representing desired VCM coil current on line 191 and (2) a current sense signal 193 that represents current flowing through a sense resister 218 and coil 70. A resister 214 is coupled between control signal 195 and a base of bipolar transistor 210. A resister 216 is coupled between control signal 195 from and a base of bipolar transistor 212. Control signal 195 controls transistors 210 and 212 to provide the desired VCM coil current through coil 70. Control signal 195 causes one of transistors 210 or 212 to conduct current from the +12 volts power rail through transistor 210 to node 206 or current from the −12 volt power rail through transistor 212 to node 206.

According to one embodiment, VCM voltage limiting circuit 202 comprises a diode 220, a NPN bipolar transistor 222, a resistor 224, and a resistor 226. Diode 220 is coupled between node 206 and a collector of bipolar transistor 222. An emitter of bipolar transistor 222 is coupled to node 208. Resistor 226 is coupled between a base of bipolar transistor 222 and a node 228. Resistor 224 is coupled between the +12 volt power rail and node 228. The VCM velocity control signal from servo controller 188 is provided on line 204 to node 228 to control the base of bipolar transistor 222. When servo processor 186 commands servo controller 188 to temporarily activate the VCM velocity control signal on line 204, bipolar transistor 222 goes from an off state to a saturated condition which conducts current away from VCM 60 to limit the voltage applied across coil 70 of VCM 60 to a predetermined VCM voltage level in order to limit the actuator arm velocity, such as maintaining the movement of the actuator arm at a substantially constant actuator arm velocity.

Suitably, the predetermined voltage level across coil 70 of VCM 60 is the voltage drop from first node 206 to second node 208 which is equal to the collector-emitter voltage drop (Vce) of bipolar transistor 222 plus the forward bias voltage drop (Vfwd) of diode 220. In one example embodiment the Vce of bipolar transistor 222 is approximately 0.2 volts and the Vfwd of diode 220 is approximately 0.7 volts resulting in a total voltage drop from node 206 to node 208 of approximately 0.9 volts.

Limiting the voltage applied across coil 70 to the predetermined voltage level reduces the actuator arm velocity to a substantially constant actuator arm velocity. Actuator arm 62 decelerates until the BEMF of VCM 60 is equivalent to the predetermined VCM voltage level between first node 206 and first node 208 which is equal to Vce of transistor 222 plus Vfwd of diode 220.

At this point, actuator arm 62 is moving at a substantially constant and safe actuator arm velocity toward outer diameter crash stop 118 and push pin 106. The safe substantially constant actuator arm velocity corresponds to the predetermined VCM voltage level between first node 206 and first node 208 and can be ascertained by knowing the BEMF factor (Ke) of VCM 60 and the voltage Vcoil across coil 70 as shown by the above Equations I.

Alternatively, VCM voltage limiting circuit 202 does not include diode 220 to thereby provide only the Vce of bipolar transistor 222 between nodes 206 and 208 once the VCM velocity control signal on line 204 is activated. This alternative embodiment of VCM voltage limiting circuit 202 is suitably employed in applications which require a reduced substantially constant actuator arm velocity or where the BEMF factor (Ke) of VCM 60 is quite low.

According to another alternate embodiment of VCM voltage limiting circuit 202, diode 220 is replaced with a zener diode or a resistor is coupled in series with diode 220 to increase the voltage drop between nodes 206 and 208 once the VCM voltage control signal on line 204 is activated. This alternate embodiment of VCM voltage limiting circuit 202 is suitably employed in applications which require an increased substantially constant actuator arm velocity once the VCM velocity control signal 204 is activated or where the BEMF factor (Ke) of VCM 60 is quite high.

The above described VCM voltage limiting circuit 202 is suitably implemented in TTL logic using bipolar transistors for an embodiment of servowriter 134 where VCM voltage limiting circuit 202 is implemented in discrete logic on a circuit board of servowriter 134. An alternative embodiment of servowriter 134 implements a VCM voltage limiting circuit similar to VCM voltage limiting circuit 202, but in CMOS logic using FETs in one of the gate arrays mounted on a circuit board of servowriter 134.

Detailed Operation of VCM Voltage Limiting Circuit in Disk Drive

FIG. 5 is a detailed schematic diagram illustrating the operation of VCM voltage limiting circuit 302 in disk drive 30. Disk drive 30 includes first node 306 and second node 308. Coil 70 of VCM 60 is coupled between first node 306 and second node 308. As illustrated in FIG. 5, one embodiment of VCM driver 92 of disk drive 30 includes four FETs coupled in a conventional H-Bridge construction across coil 70 of VCM 60. VCM coil 70 is coupled to the H-Bridge FETs of VCM driver 92 between first node 306 and second node 308. The H-Bridge FET construction of VCM driver 92 includes a P-FET 374 coupled between the +12 volt power rail and node 306 and a P-FET 376 coupled between the +12 volt power rail and second node 308 through a sense resistor 377. The H-Bridge FET construction of VCM driver 92 also includes an N-FET 378 coupled between the ground node and first node 306 and an N-FET 380 coupled between second node 308 and the ground node through sense resister 377.

VCM driver 92 includes a current sensor 379 and a pulse width modulated (PWM) current controller 319. Current sensor 379 generates a current sense signal 93 that represents current flowing through sense resister 377 and coil 70. Current controller 319 generates control signals 95a–95d in response to current sense signal 93 and the analog signal representing desired VCM coil current on line 91.

Current controller 319 controls which of FETs 374, 376, 378, and 380 are turned on via lines 91a, 91b, 91c, and 91d respectively. The FETs of VCM driver 92 are controlled such that P-FET 374 and N-FET 380 are turned on while P-FET 376 and N-FET 378 are off to thereby conduct current from the +12 volt power rail to first node 306 and to ground node 308. Similarly, while P-FET 376 and N-FET 378 are turned on, P-FET 374 and N-FET 380 are off to thereby conduct current from the +12 volt power rail to second node 308 and to ground node 306. By switching selectively between the above two states current flows through VCM coil 70 to cause movement of coil 70 which in turn causes attached actuator arm 62 to swing and thereby move transducer head 64 over disk 50.

According to one embodiment, VCM voltage limiting circuit 302 of disk drive 30 comprises a diode 320, a NPN bipolar transistor 322, a resistor 324, and a resistor 326. Diode 320 is coupled between node 206 and a collector of bipolar transistor 322. An emitter of bipolar transistor 322 is coupled to node 208. Resistor 326 is coupled between a base of bipolar transistor 322 and a node 328. Resistor 324 is coupled between the +12 volt power rail and node 328.

VCM voltage limiting circuit 302 of disk drive 30 also comprises a diode 330, a NPN bipolar transistor 332, a resistor 334, and a resistor 336. Diode 330 is coupled between node 308 and a collector of bipolar transistor 332. An emitter of bipolar transistor 332 is coupled to node 306. Resistor 336 is coupled between a base of bipolar transistor 332 and a node 328. Resistor 334 is coupled between the +12 volt power rail and node 328.

The VCM velocity control signal from servo controller 88 is provided on line 304 to node 328 to control the bases of bipolar transistors 322 and 332. After servo processor 86 commands servo controller 88 to temporarily activate the VCM velocity control signal on line 304 two conditions exist in VCM voltage limiting circuit 302. In the first condition, VCM driver applies the voltage V to first node 306 and grounds second node 308 through sense resister 377 causing diode 320 to be forward biased and diode 330 to be reversed biased, and bipolar transistor 322 goes from an off state to a saturated condition which conducts current away from VCM 60 to limit the voltage V applied across coil 70 of VCM 60 to the predetermined VCM voltage level between first node 306 and second node 308 in order to limit the actuator arm velocity, such as maintaining the movement of the actuator arm at a substantially constant actuator arm velocity. In the second condition, VCM driver applies the voltage V to second node 308 through sense resister 377 and grounds first node 306 causing diode 330 to be forward biased and diode 320 to be reversed biased, and bipolar transistor 332 goes from an off state to a saturated condition which conducts current away from VCM 60 to limit the voltage V applied across coil 70 of VCM 60 to the predetermined VCM voltage level between first node 306 and second node 308 in order to limit the actuator arm velocity, such as maintaining the movement of the actuator arm at a substantially constant actuator arm velocity.

Suitably, the predetermined VCM voltage level across coil 70 of VCM 60 is the voltage drop from first node 306 to second node 308 which is equal to the Vce of bipolar transistor 322 plus the Vfwd of diode 320 for the first condition where diode 320 is forward biased and is equal to the Vce of bipolar transistor 332 plus the Vfwd of diode 330 for the second condition where diode 330 is forward biased. In one example embodiment the Vce of bipolar transistors 322 and 332 is approximately 0.2 volts and the Vfwd of diodes 320 and 330 is approximately 0.7 volts resulting in a total voltage drop from first node 306 to second node 308 of approximately 0.9 volts.

Limiting the voltage applied across coil 70 to the predetermined VCM voltage level reduces the actuator arm velocity to a substantially constant actuator arm velocity. Actuator arm 62 decelerates until the BEMF of VCM 60 is equivalent to the predetermined VCM voltage level between first node 306 and second node 308. At this point, actuator arm 62 is moving at a substantially constant and safe actuator arm velocity toward outer diameter crash stop 118. The safe substantially constant actuator arm velocity corresponds to the predetermined VCM voltage level between first node 306 and second 308 and can be ascertained by knowing the BEMF factor (Ke) of VCM 60 and the voltage Vcoil across coil 70 as shown by the above Equations I.

Alternatively, VCM voltage limiting circuit 302 does not include diode 320 or diode 330 to thereby provide only the Vce of bipolar transistors 322 or 332 between nodes 306 and 308 once the VCM velocity control signal on line 304 is activated. This alternate embodiment of VCM voltage limiting circuit 302 is suitably employed in applications which require a reduced substantially constant actuator arm velocity or where the BEMF factor (Ke) of VCM 60 is quite low.

According to another alternate embodiment of VCM voltage limiting circuit 302, diodes 320 and 330 are replaced with zener diodes or resistors are coupled in series with diodes 320 and 330 to increase the voltage drop between nodes 306 and 308 once the VCM voltage control signal on line 304 is activated. This alternate embodiment of VCM voltage limiting circuit 302 is suitably employed in applications which require an increased substantially constant actuator arm velocity once the VCM velocity control signal 304 is activated or where the BEMF factor (Ke) of VCM 60 is quite high.

The above described VCM voltage limiting circuit 302 is suitably implemented in TTL logic using bipolar transistors for an embodiment of disk drive 30 where VCM voltage limiting circuit 302 is implemented in discrete logic on disk controller circuit board 32. An alternative embodiment of disk drive 30 implements a VCM voltage limiting circuit similar to VCM voltage limiting circuit 302, but in CMOS logic using FETs in one of the gate arrays mounted on disk controller circuit board 32.

We claim:

1. A method of unlatching an actuator arm from a latch restraining the actuator arm in a disk drive, the disk drive including a first node, a second node, and a voice coil motor (VCM) coupled to the actuator arm, the VCM including a coil connected between the first node and the second node, the method comprising the steps of:

a. applying a voltage between the first node and the second node to cause current to flow through the coil in order to move the actuator arm away from the latch at an actuator arm velocity;

b. temporarily activating a VCM velocity control signal to enable a VCM voltage limiting circuit connected in parallel with the coil between the first node and the second node; and c. clamping the voltage applied across the coil to a predetermined VCM voltage level with the enabled VCM voltage limiting circuit in order to decelerate the actuator arm toward a selected actuator arm velocity.

2. The method of claim 1 wherein the VCM voltage limiting circuit includes a transistor having a voltage drop when the temporarily activating step activates the VCM velocity control signal.

3. The method of claim 2 wherein the VCM voltage limiting circuit includes a diode coupled in series with the transistor, the diode having a forward voltage drop when the temporarily activating step activates the VCM velocity control signal.

4. A disk drive comprising:

an actuator arm;

a latch for restraining the actuator arm;

a first node;

a second node;

a voice coil motor (VCM) coupled to the actuator arm, the VCM having a coil being connected between the first node and the second node;

a VCM driver for applying a voltage between the first node and the second node to cause current to flow through the coil in order to move the actuator arm away from the latch at a variable actuator arm velocity;

control means for temporarily activating a VCM velocity control signal; and a VCM voltage limiting circuit connected in parallel with the coil between the first node and the second node, the VCM voltage limiting circuit being responsive to the VCM velocity control signal being temporarily activated for clamping the voltage applied across the coil to a predetermined VCM voltage level in order to decelerate the actuator arm toward a selected actuator arm velocity.

5. The disk drive of claim 4 wherein the VCM voltage limiting circuit includes a transistor having a voltage drop when the control means temporarily activates the VCM velocity control signal.

6. The disk drive of claim 5 wherein the VCM voltage limiting circuit includes a diode coupled in series with the transistor, the diode having a forward voltage drop when the control means temporarily activates the VCM velocity control signal.

7. The disk drive of claim 4 wherein the latch is a magnetic latch.

* * * * *